United States Patent
Fujita et al.

(10) Patent No.: US 6,216,814 B1
(45) Date of Patent: Apr. 17, 2001

(54) POWER STEERING APPARATUS

(75) Inventors: Kazuhiko Fujita, Kashihara; Tsuyoshi Nakajima, Yokohama, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/326,671

(22) Filed: Jun. 7, 1999

(30) Foreign Application Priority Data

Jun. 8, 1998 (JP) .................................................. 10-159570

(51) Int. Cl.$^7$ ........................................................ B62D 5/09
(52) U.S. Cl. ............................................. 180/422; 701/41
(58) Field of Search ................................. 701/41, 42, 43; 180/446, 417, 421, 422

(56) References Cited

U.S. PATENT DOCUMENTS

| | | | |
|---|---|---|---|
| 4,875,539 | * 10/1989 | Abukawa et al. | 180/79.1 |
| 5,460,235 | * 10/1995 | Shimizu | 180/79.1 |
| 5,737,223 | * 4/1998 | Matsuoka | 364/424.051 |
| 5,758,741 | * 6/1998 | Tomioka | 180/446 |
| 5,996,724 | * 12/1999 | Shimizu et al. | 180/446 |

* cited by examiner

Primary Examiner—Paul N. Dickson
Assistant Examiner—Avraham H. Lerner
(74) Attorney, Agent, or Firm—Rabin & Champagne, PC

(57) ABSTRACT

A power steering apparatus which generates a steering assist force by a hydraulic pressure of a pump driven by an electric motor. The apparatus includes: an electric current sensor for sensing an electric current flowing through the electric motor; and a control circuit for switching a voltage to be applied to the electric motor from a standby voltage to an assist voltage if the motor current is higher than a first threshold or if a change rate of the motor current is higher than a second threshold.

3 Claims, 3 Drawing Sheets

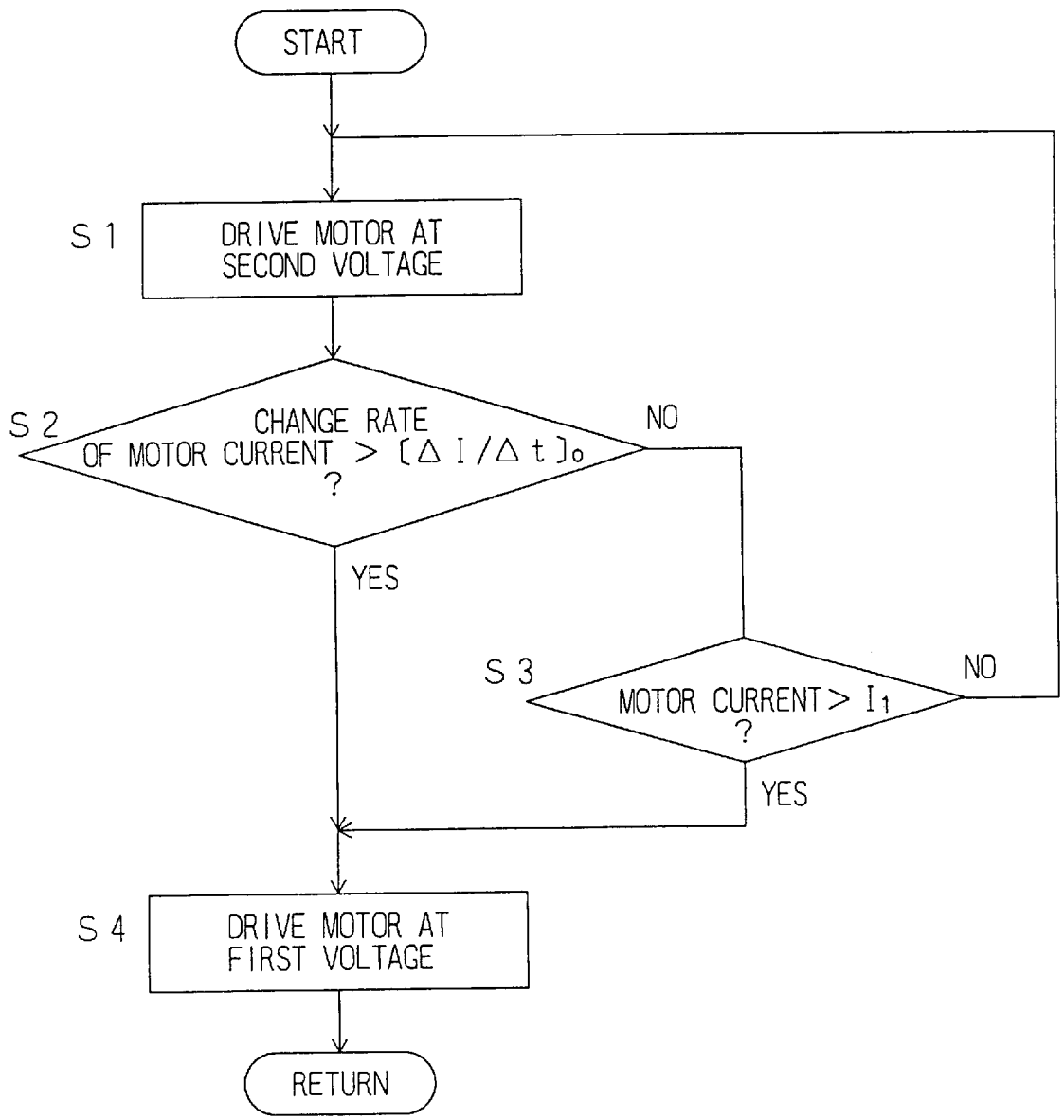

POWER STEERING APPARATUS

BACKGROUND OF THE INVENTION

1. Field of the Invention

The present invention relates to a power steering apparatus which applies a steering assist force to a steering mechanism by a hydraulic pressure generated by a pump driven by an electric motor.

2. Description of Related Art

Power steering apparatuses are conventionally utilized which assist operation of a steering wheel by supplying a working oil from an oil pump to a power cylinder coupled to a steering mechanism. The oil pump is driven by an electric motor, and a steering assist force is generated by the power cylinder in accordance with the rotation speed of the electric motor. The steering assist force is not required when the steering wheel is not turned. Therefore, the electric motor is off in a straight travel steering state (a non-steering state) where the steering wheel assumes a position virtually at a steering angle midpoint and, in response to detection of a change in any of steering-related conditions, the electric motor is actuated.

However, a recent trend is that a standby driving operation is performed to drive the electric motor at a low voltage in the non-steering state to ensure a smooth rise of the hydraulic pressure.

For the electric motor control, it is necessary to determine a time point at which a steering operation is started in the non-steering state.

The electric motor control may be achieved, for example, by sensing an electric current flowing through the electric motor and increasing a driving voltage when the electric current exceeds a threshold. However, this control method suffers from such a drawback that the hydraulic pressure rise cannot keep up with an abrupt steering operation thereby resulting in a bad steering feeling.

In conventional motor-driven pump hydraulic power steering apparatuses, the driving voltage of the electric motor is set higher in the non-steering state, or a steering angle sensor for sensing a steering angle is employed for improvement of a response time of the hydraulic pressure rise. However, the former approach trades off the power consumption, and the latter approach requires an expensive component.

SUMMARY OF THE INVENTION

It is an object of the present invention to provide a power steering apparatus which is capable of quickly detecting a steering state even at the start of an abrupt steering operation without deterioration in steering performance.

The power steering apparatus according to the present invention comprises a control circuit which is capable of switching a control mode between a first mode (assist mode) in which a first voltage is applied to an electric motor when a steering operation is performed and a second mode (standby mode) in which a second voltage lower than the first voltage is applied to the electric motor when the steering operation is not performed, wherein the control circuit includes means for judging (a) if an electric current sensed by an electric current sensor is higher than a first threshold in the standby mode and (b) if a change rate of the electric current sensed by the electric current sensor is higher than a second threshold in the standby mode, and the control circuit switches the control mode from the standby mode to the assist mode if at least one of the conditions (a) and (b) is satisfied.

FIG. 1 is a graph showing a change in the motor current I before and after the steering operation is started, in which the first threshold (electric current threshold) is indicated by $I_1$, the second threshold (change rate threshold) is indicated by an inclined straight line, an electric current differential is indicated by $\Delta I$, and a time differential is indicated by $\Delta t$. Before the start of the steering operation, the motor current I is lower than the first threshold $I_1$. After the start of the steering operation, however, the motor current I increases to exceed the first threshold $I_1$ at a certain time point, and the change rate of the motor current exceeds the second threshold at another time point.

In accordance with the present invention, when the steering operation is started in the standby mode, the control mode is switched from the standby mode to the assist mode on the basis of a logical OR between the condition that the electric current sensed by the electric current sensor is higher than the first threshold $I_1$ and the condition that the change rate of the electric current is higher than the second threshold.

When the steering operation is abruptly started, the time point at which the electric current change rate $\Delta I/\Delta t$ exceeds the second threshold comes earlier than the time point at which the electric current I exceeds the first threshold $I_1$. Thus, the start of the abrupt steering operation can be detected more quickly.

Where the time point at which the electric current I exceeds the first threshold $I_1$ comes earlier than the time point at which the electric current change rate $\Delta I/\Delta t$ exceeds the second threshold, unlike the case shown in FIG. 1, it is also possible to promptly detect the start of the steering operation.

Thus, the power steering apparatus of the present invention can promptly detect the abrupt steering operation without the use of an expensive steering angle sensor to ensure a satisfactory steering feeling at the start of the steering operation.

The foregoing and other objects, features and effects of the present invention will become more apparent from the following description of the preferred embodiments with reference to the attached drawings.

BRIEF DESCRIPTION OF THE DRAWINGS

FIG. 3 is a flow chart for explaining a process sequence to be performed to switch a control mode from a second voltage application mode to a first voltage application mode.

DESCRIPTION OF THE PREFERRED EMBODIMENTS

Figure 1:
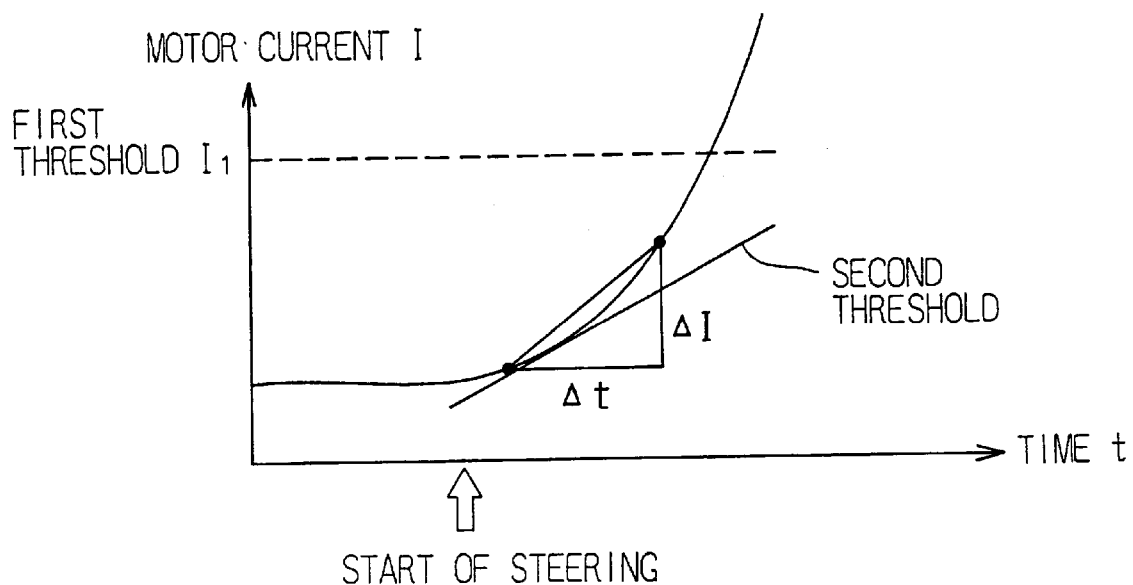
FIG. 1 is a graph showing a change in motor current I before and after a steering operation is started.
Figure 2:
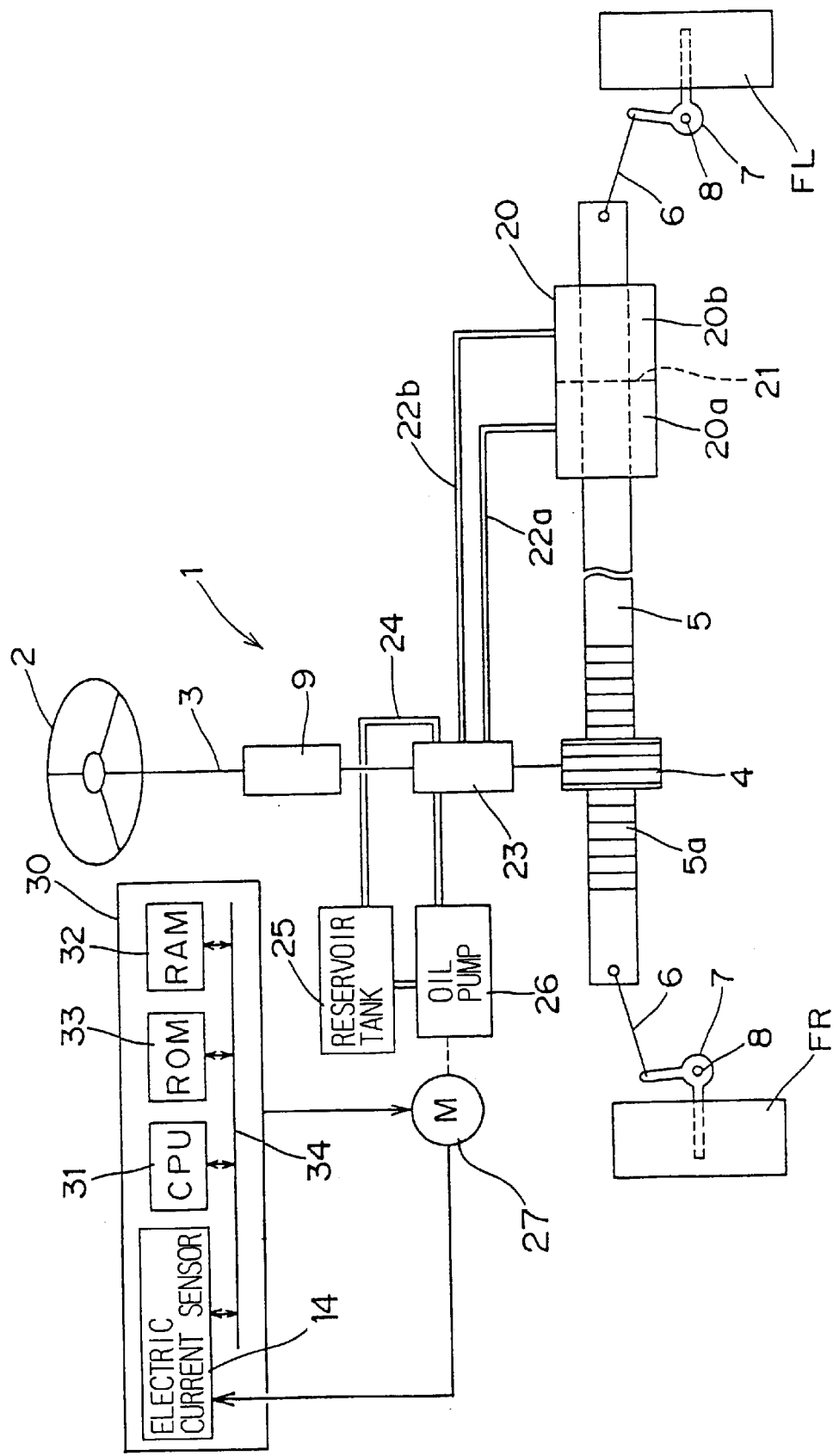
FIG. 2 is a block diagram illustrating the basic construction of a power steering apparatus.

FIG. 2 is a block diagram illustrating the basic construction of a power steering apparatus.

A steering mechanism 1 includes a steering wheel 2 to be operated by a driver, a steering shaft 3 coupled to the steering wheel 2, a pinion gear 4 provided at a distal end of the steering shaft 3, and a rack shaft 5 having a rack gear 5*a* meshed with the pinion gear 4 and extending transversely of a motor vehicle.

Tie rods 6 are connected to opposite ends of the rack shaft 5, and further connected to knuckle arms 7 which respectively support left and right front wheels FL and FR as steerable wheels. The knuckle arms 7 are respectively rotatable about king pins 8.

With this arrangement, when the steering wheel 2 is operated to rotate the steering shaft 3, the rotational motion is converted into a linear motion transverse to the motor vehicle by the pinion gear 4 and the rack shaft 5, thereby achieving the steering of the left and right front wheels FL, FR.

A torsion bar 9 which is adapted to be twisted in accordance with the direction and magnitude of a steering torque applied to the steering wheel 2 and a hydraulic pressure control valve 23 which is adapted to change its valve aperture in accordance with the direction and magnitude of the torsion of the torsion bar 9 are incorporated in the steering shaft 3. The hydraulic pressure control valve 23 is connected to a power cylinder 20 for applying a steering assist force to the steering mechanism 1. The power cylinder 20 includes a piston 21 provided integrally with the rack shaft 5, and a pair of cylinder chambers 20a and 20b split by the piston 21. The cylinder chambers 20a and 20b are connected to the hydraulic pressure control valve 23 via oil supply/return lines 22a and 22b, respectively.

The hydraulic pressure control valve 23 is disposed in an oil circulation line 24 which extends through a reservoir tank 25 and an oil pump 26. The oil pump 26 is driven by an electric motor 27, so that a working oil contained in the reservoir tank 25 is pumped up and supplied to the hydraulic pressure control valve 23. An excess of the working oil is returned to the reservoir tank 25 from the hydraulic pressure control valve 23 via the oil circulation line 24.

When a torsion is exerted on the torsion bar 9 in one direction, the hydraulic pressure control valve 23 supplies the working oil to one of the cylinder chambers 20a, 20b of the power cylinder 20 via one of the oil supply/return lines 22a, 22b. When a torsion is exerted on the torsion bar 9 in the other direction, the hydraulic pressure control valve supplies the working oil to the other of the cylinder chambers 20a, 20b of the power cylinder 20 via the other of the oil supply/return lines 22a, 22b. When virtually no torsion is exerted on the torsion bar 9, the hydraulic pressure control valve 23 is in a so-called equilibrium state, so that the working oil is not supplied to the power cylinder 20 but circulated in the oil circulation line 24.

When the working oil is supplied to either one of the cylinder chambers of the power cylinder 20, the piston 21 moves transversely of the motor vehicle. Thus, a steering assist force acts on the rack shaft 5 (power assist).

The magnitude of the steering assist force can be adjusted by controlling a voltage to be applied to the electric motor 27 which drives the oil pump 26.

The motor 27 is controlled by an electronic control unit 30. The electronic control unit 30 includes a CPU 31, a RAM 32 which provides a work area for the CPU 31, a ROM 33 storing therein operation programs for the CPU 31, buses 34 interconnecting these components, and an electric current sensor 14 for sensing an electric current flowing through the electric motor 27.

The electronic control unit 30 determines the voltage to be applied to the electric motor 27 on the basis of an output signal of the electric current sensor 14, as will be described later. Thus, a proper steering assist force can be applied to the steering mechanism 1.

In this embodiment, a standby driving operation is performed to drive the electric motor 27 at a low voltage even in a non-steering state for elimination of an entrapped feeling in the steering operation and for smooth actuation of the electric motor 27.

For the standby driving operation, the electronic control unit 30 constantly applies a relatively low standby voltage (second voltage) $V_2$ to the electric motor 27, and applies an assist voltage (first voltage) $V_1$ sufficient for the power assist to the electric motor 27 on the basis of the following conditions.

Referring to the flow chart of FIG. 3, an explanation will be given to the conditions to be satisfied when the control mode is switched from the second voltage $V_2$ application mode to the first voltage $V_1$ application mode.

When the electronic control unit 30 is actuated in response to the turn-on of an ignition switch or the like, the electronic control unit 30 drives the electric motor 27 at the second voltage $V_2$ (Step S1). When the steering operation is thereafter performed, a torsion is exerted on the torsion bar 9, and the working oil is supplied to either one of the cylinder chambers of the power cylinder 20, whereby a load is exerted on the electric motor 27 so that the electric current flowing through the electric motor 27 is increased. Accordingly, the electric current sensed by the electric current sensor 14 is increased.

The electronic control unit 30 first checks a change rate $\Delta I/\Delta t$ of the sensed electric current. The change rate $\Delta I/\Delta t$ is determined by how much the sensed electric current I changes in a unit time.

The electronic control unit 30 judges whether or not the change rate $\Delta I/\Delta t$ is greater than a threshold $[\Delta I/\Delta t]_0$ (change rate threshold, e.g., 25 A/sec) (Step S2: steering operation start judging circuit). If it is judged that the change rate is greater than the change rate threshold, the electronic control unit 30 applies the first voltage $V_1$ to the electronic motor 27 for application of a steering assist force (Step S4). The change rate threshold $[\Delta I/\Delta t]_0$ is preferably set relatively small, because the provision of the change rate threshold aims at eliminating an entrapped feeling in an abrupt steering operation. If the change rate threshold is too low, however, the steering feeling becomes unstable in vehicle traveling. It is preferred that the value of the threshold is experimentally determined on the basis of a vehicle driving test and the like.

Even with the change rate $\Delta I/\Delta t$ being not higher than the threshold $[\Delta I/\Delta t]_0$, if the motor current I exceeds a threshold (electric current threshold) $I_1$ (YES in Step S3: steering operation start judging circuit), the first voltage $V_1$ is applied to the electric motor 27 for application of a steering assist force (Step S4).

Therefore, the abrupt steering operation can be detected more quickly than a case where the detection of the abrupt steering operation is based on the judgment in Step S2 alone or on the judgment in Step S3 alone.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

What is claimed is:

1. A power steering apparatus, comprising:
   an electric motor;
   a pump to be driven by the electric motor for generating a hydraulic pressure for steering assist;
   an electric current sensor for sensing an electric current flowing through the electric motor; and
   a control circuit which is capable of switching a control mode between a first mode in which a first voltage is applied to the electric motor when a steering operation is performed and a second mode in which a second voltage lower than the first voltage is applied to the electric motor when a steering operation is not performed;

wherein the control circuit includes means for judging (a) whether the electric current sensed by the electric current sensor is higher than a first threshold in the second mode and (b) whether a change rate of the electric current sensed by the electric current sensor is higher than a second threshold in the second mode, and the control circuit switches the control mode from the second mode to the first mode if at least one of the conditions (a) and (b) is satisfied.

2. A power steering apparatus, comprising:

an electric motor;

a pump to be driven by the electric motor for generating a hydraulic pressure for steering assist;

an electric current sensor for sensing an electric current flowing through the electric motor;

a steering operation start judging circuit for detecting start of a steering operation on the basis of a judgment that a rate of change of the electric current sensed by the electric current sensor over a period of time has exceeded a predetermined rate of change threshold; and a control circuit for applying a standby voltage to the electric motor when a steering operation is not performed and, in response to the detection of the start of the steering operation by the steering operation start judging circuit, applying to the electric motor an assist voltage which is higher than the standby voltage.

3. A power steering apparatus as set forth in claim 2, wherein the steering operation start judging circuit detects the start of the steering operation on the basis of a judgment that at least one of the following conditions is satisfied: the electric current sensed by the electric current sensor is higher than a predetermined electric current threshold; and the rate of change of the electric current sensed by the electric current sensor is higher than the predetermined rate of change threshold.

* * * * *